United States Patent [19]

Huang

[11] Patent Number: 5,558,395

[45] Date of Patent: *Sep. 24, 1996

[54] INFLATABLE CUSHION DEVICES FOR BICYCLE SEATS AND OTHER SPORTING GOODS

[76] Inventor: Yin-jun Huang, 15, ZerHo Yi Street, Kaohsiung City, Taiwan

[*] Notice: The term of this patent shall not extend beyond the expiration date of Pat. No. 5,335,382.

[21] Appl. No.: 281,984

[22] Filed: Jul. 29, 1994

Related U.S. Application Data

[62] Division of Ser. No. 990,173, Nov. 23, 1992, Pat. No. 5,335,382.

[51] Int. Cl.$^6$ .............................. A47C 27/08; B62J 1/26; A43B 13/20

[52] U.S. Cl. .................. 297/199; 5/655.3; 36/29; 36/153; 417/480

[58] Field of Search ............................ 5/454, 449, 453, 5/455, 644; 36/29, 153; 297/199, 200, DIG. 3, 452.41; 417/479, 480

[56] References Cited

U.S. PATENT DOCUMENTS

| | | | |
|---|---|---|---|
| 1,468,072 | 9/1923 | Ogle | 5/449 |
| 3,112,956 | 12/1963 | Schick et al. | 5/654 |
| 4,115,885 | 9/1978 | Davis | 5/654 |
| 4,255,824 | 3/1981 | Pertchik | 5/449 |
| 4,930,174 | 6/1990 | Hunter | 5/454 |
| 5,280,993 | 1/1994 | Hsh | 297/199 |
| 5,419,612 | 5/1995 | Rassekhi | 297/200 |

FOREIGN PATENT DOCUMENTS

| | | | |
|---|---|---|---|
| 766094 | 6/1934 | France | 297/199 |
| 299998 | 10/1928 | United Kingdom | 297/199 |

*Primary Examiner*—Alexander Grosz
*Attorney, Agent, or Firm*—Jacobson, Price, Holman & Stern, PLLC

[57] ABSTRACT

An inflatable air cushion has an integrally formed extension tube of zig-zag form with its free end attached to another cushion or to a pump assembly for inflating the cushion. By separating the limbs of the zig-zag tube, the cushions, or the cushion and pump assembly can be spaced apart at different distances to suit different applications. The pump may include a pressure limiting chamber integrated therewith for limiting the maximum inflation pressure of the cushion. In a preferred embodiment, the inflatable air cushion is shaped to fit a bicycle saddle.

10 Claims, 8 Drawing Sheets

INFLATABLE CUSHION DEVICES FOR BICYCLE SEATS AND OTHER SPORTING GOODS

This is a divisional of application Ser. No. 07/990,173, filed Nov. 23, 1992, now U.S. Pat. No. 5,335,382.

BACKGROUND OF THE INVENTION

1. Field of the Invention

This invention relates to an air cushion device for sports goods, and more particularly to an air cushion device including an extension tube, connected in a plane, "S"-shaped or zig-zag arrangement formed integrally with the cushion, and disposed either between two integrally formed cushions or between a cushion and a pressure pump to give free adjustment of the spacing between cushions or between a cushion and a pump without the necessity of making the connection by means of other components. The invention also concerns a pressure-limiting chamber formed integrally with the pressure pump, and having a preset or variable capacity so as to set the maximum value for pressurizing the cushion, whereby the pressure pump automatically will stop supplying air to the cushion once the inner pressure of the cushion reaches the value preset by the pressure limiting chamber. The present invention can be applied to a seat or saddle cushion, protection gear, shoes and other objects requiring the installation of a cushion.

2. Description of the Prior Art

There is a wide range of articles using the application of an air cushion as generally found in the present market. The cushion typically may comprise two sheets of material overlapped and sealed by heat, or the cushion may be cast with hollow dies. No matter how such a cushion may be manufactured, the prior art designs achieve a connection between cushions or between a cushion and a pump by using a separate tube. However, such a method of connection although it will achieve its purpose, increases the production costs with further time consumption and inconveniences in production while there is no way to guarantee that potential air leakage from the connection can be avoided. Therefore, the prior art in which an additional connection tube is used between two cushions or between a cushion and other components (namely, a pump, or pressure valve) fails to provide optimal effectiveness with regard to air leakage.

In addition, different spacing requirements may be needed between two cushions or between a cushion and another component (such as if one cushion is required to be installed in the sole of a shoe while a pressurizing component and other components are required to be disposed in the top quarter) depending on the size of the shoes, and shape of the shoes, or the type of shoe, for example, jumping boots, or ordinary shoes have different size and shapes. To manufacturers, it could mean the more difficult processes, more inventory and failure to practice a proper control of the sizes and quantities to be produced since there is a wide range of product sizes involved.

Furthermore, the requirement of having an additional connection tube disposed between the cushion and the pump in the design of cushion requiring an automated pressure pump will present problems of being vulnerable to air leakage. Also, a design of cushion using hte automated operation on the pressure pump which is alternatively depressed under impact of the foot to pressurize the cushion and then released, generally will include a pressure release valve on the cushion capable of presetting the pressure by automatically releasing the pressure from the cushion when exceeding the preset value of the valve so that the cushion is preset at a constant maximum pressure value. The prior art using an air release valve to protect the cushion not only causes hardening over a certain area on the cushion resulting from the air release valve being made of metal, but also may result in injuries to the athlete when installed in sports shoes. Even though an air release valve mechanism can be positioned at a safe and proper position of the product, the connection tube will be exposed, leading to possible falling off of the connection tube or air leakage.

SUMMARY OF THE INVENTION

Accordingly, an object of the present invention is to provide an improved air cushion device for sports goods to eliminate or at least reduce the aforesaid flaws of the prior art.

With the above object in view, the present invention provides an air cushion with 1) an integrally formed extension tube, and using the unique design of said tube to comply with the application requirements for connection of the cushion to another cushion or pump at different spacings; 2) an integrally formed extension tube with variable length to avoid air leakage due to the absence of connecting points between the cushions; and 3) an integrally formed pressure limiting chamber connected to one side of an automated pressure pump, thus further eliminating the need for disposing a separate air release valve in the cushion and using the pressure limiting chamber either of fixed or variable volume to control the maximum inflating pressure of the cushion.

BRIEF DESCRIPTION OF THE DRAWINGS

The present invention will become more readily apparent from the following description of preferred embodiments thereof taken in conjunction with the accompanying drawings, in which:

FIG. 10B is a view similar to FIG. 10A showing how the cushion is folded on itself for use in an athletic shoe or the like;

DETAILED DESCRIPTION OF THE PREFERRED EMBODIMENTS

Figure 1:
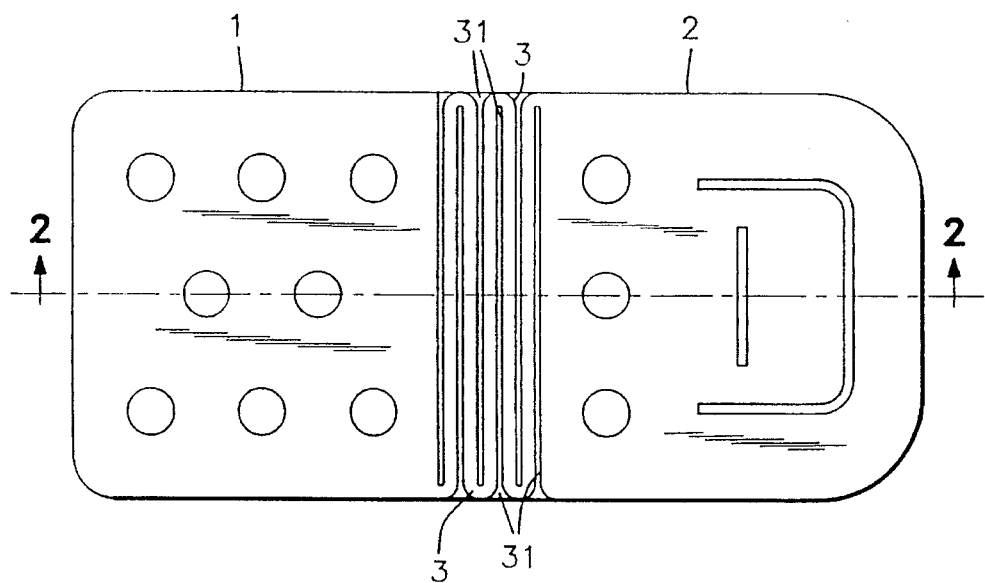
FIG. 1 is a plan view of one embodiment of the invention illustrating an extension tube between two cushions.
Figure 2:
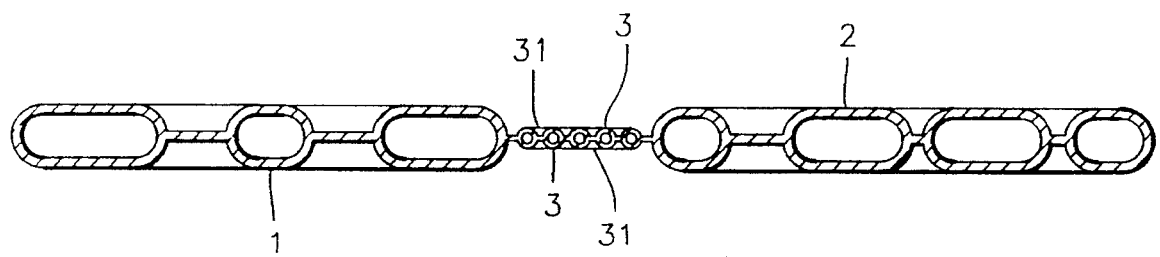
FIG. 2 is a section view on line 2—2 of FIG. 1.
Figure 3:
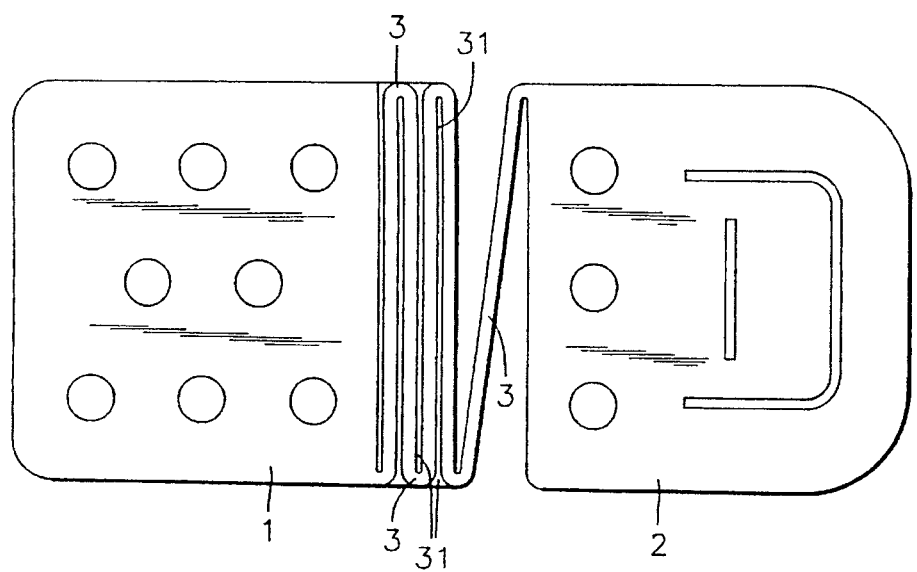
FIG. 3 is a view similar to FIG. 1 with the cushion extended.
Figure 4:
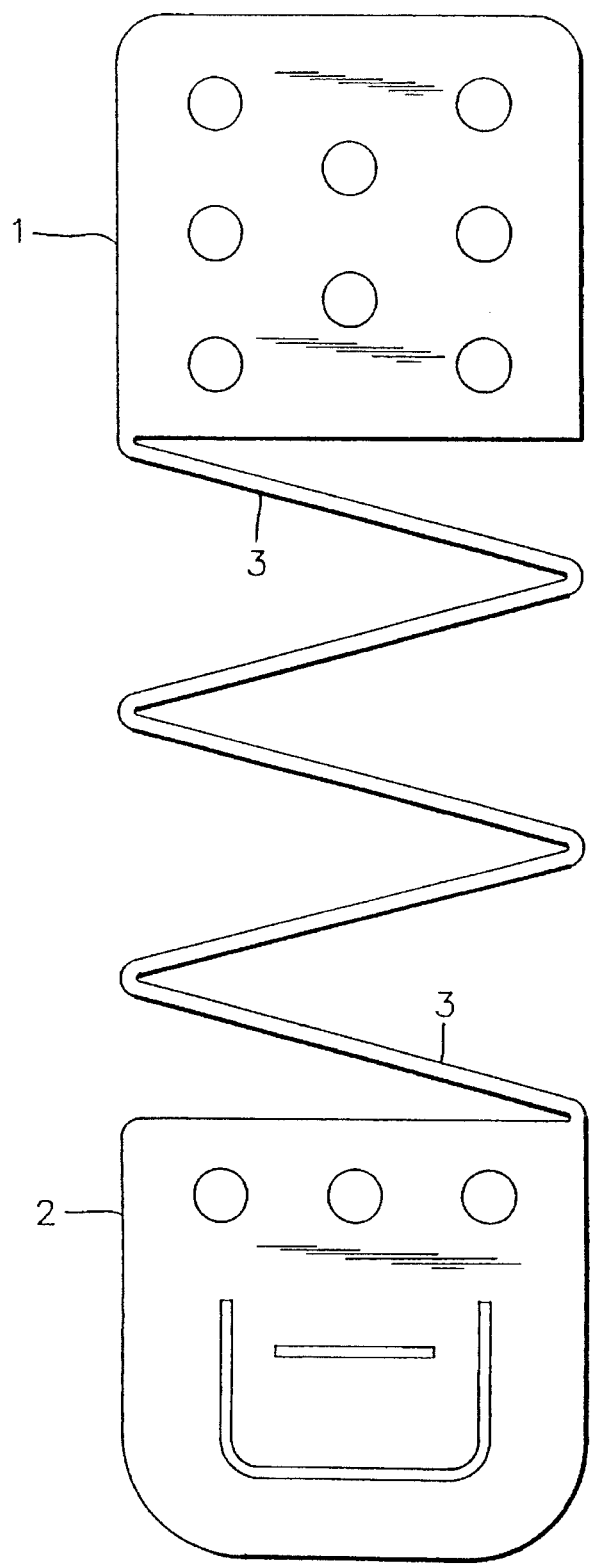
FIG. 4 is another view similar to FIG. 1 with the cushion extended.

FIGS. 1, 2, 3 and 4 of the accompanying drawings illustrate a first embodiment of an integrally formed extension tube 3 between two inflatable cushions 1 and 2. Cushion 1 and cushion 2 can be made of two sheets of plastic or like materials sealed by thermal treatment around the perimeter or formed by air blowing plastic material into a hollow object in a mold. During the manufacturing process of integrally forming both cushions 1 and 2, the sheet material between cushion 1 and cushion 2 is also integrally formed with a preset length in a "S"-shaped or zig zag arrangement comprising several limbs of an extension tube 3 with opposite ends of said extension tube, also integrally formed, and connected with the interior of cushions 1 and 2. As illustrated in FIGS. 3 and 4, there may be a web 31 present between the parallel limbs of the extension tube so that when the spacing between two cushions 1 and 2 is required to be somewhat extended, the desired separating and spacing between cushions 1 and 2 can be achieved by cutting the required number of sheet material webs 31. Before such cutting of the sheet material webs 31, the two cushions 1 and 2 and extension tube 3 comprise a one-piece cushion. The greater the number of limbs cut by the sheet material webs 31 the larger can be the maximum extension spacing between the two cushions 1 and 2, and hte smaller the number of webs cut, the smaller is the maximum extension spacing. The cushions 1 and 2 can be disposed immediately adjacent one another without cutting any webs (FIG. 1) or at an intermediate spacing (FIG. 3) by cutting some of the webs, or at a maximum spacing (FIG. 4) by cutting all of the webs. The spacing depends on the product in which the cushion is used.

Figure 5:
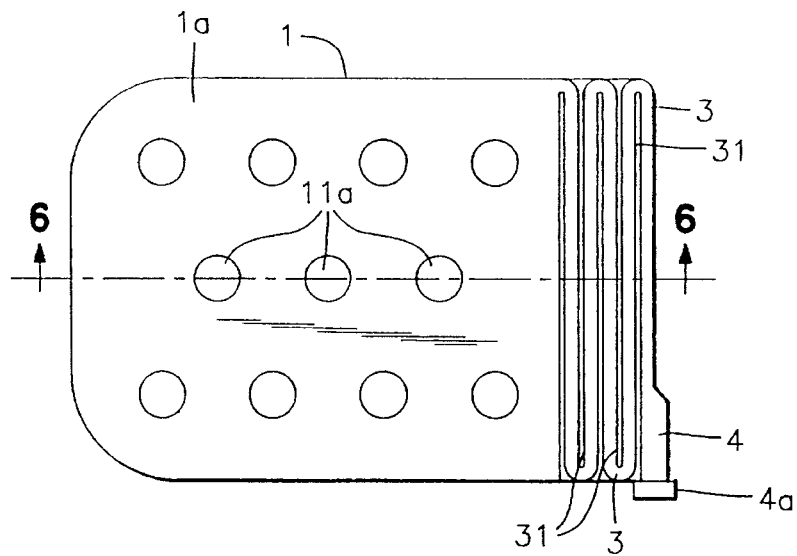
FIG. 5 is a plan view of a second embodiment of the invention illustrating an extension tube between a cushion and another component.
Figure 6:
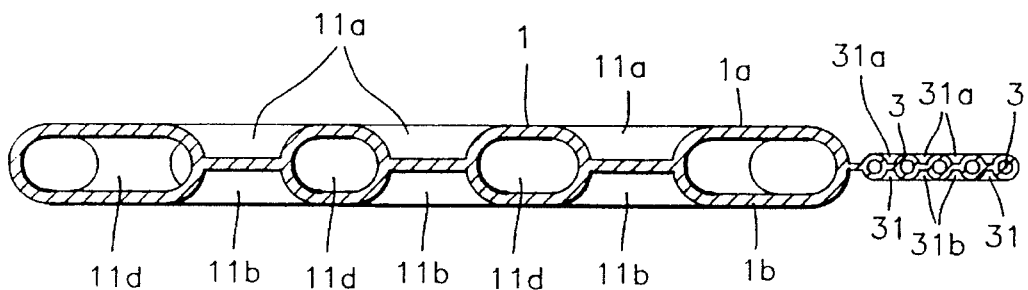
FIG. 6 is a section view taken on line 6—6 of FIG. 5.
Figure 7:
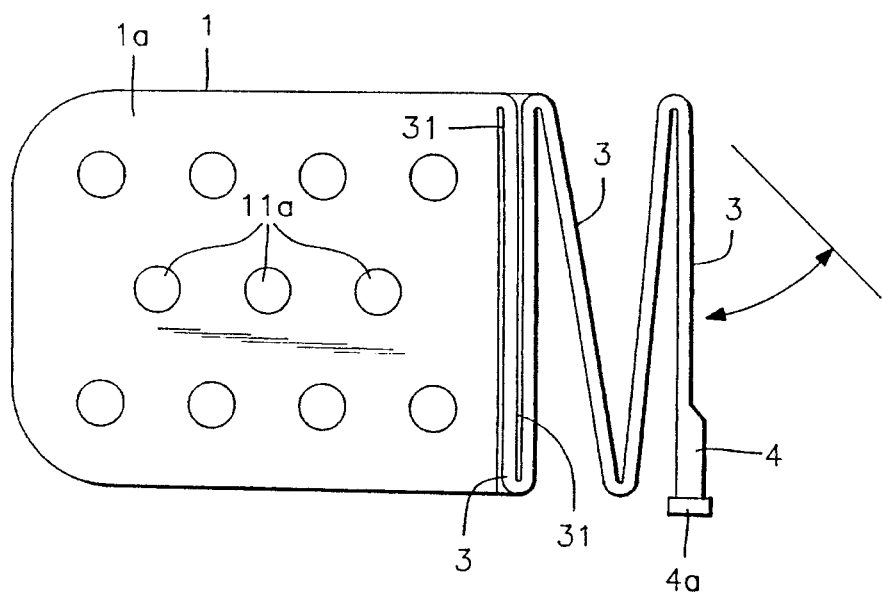
FIG. 7 is a view similar to FIG. 5 showing the tube extended.

FIGS. 5, 6 and 7 illustrate an embodiment of the invention wherein an integrally formed extension tube 3 is provided between an air cushion and another component 4a which may be an air nozzle, an air regulating valve, an air release valve, one-way valve, or like air inflation means so that tube 3 forms an airflow conduit between the cushion and the inflation means. This arrangement is similar to the previous embodiment with the respective limbs of tube 3 being connected by integral webs 31. Tube end 4 can be connected to any one of the above components and the spacing between such component and cushion can again be selected by cutting the required number of webs 31 and pulling out the tubing 3 to the required amount to provide the required spacing between cushion 1 and said component.

It is also evident from FIG. 6 that the webs 31 are formed by a first set of recesses 31a formed in an upper sheet 1a of the cushion structure, and a second set of corresponding recesses 31b formed in a lower sheet 1b of the cushion structure, the recesses 31a and 31b being sealed together to form the webs 31. The sheets 1a and 1b have further recesses 11a, 11b sealed together and dividing the cushion into intercommunicating compartments 11d.

Figure 8:
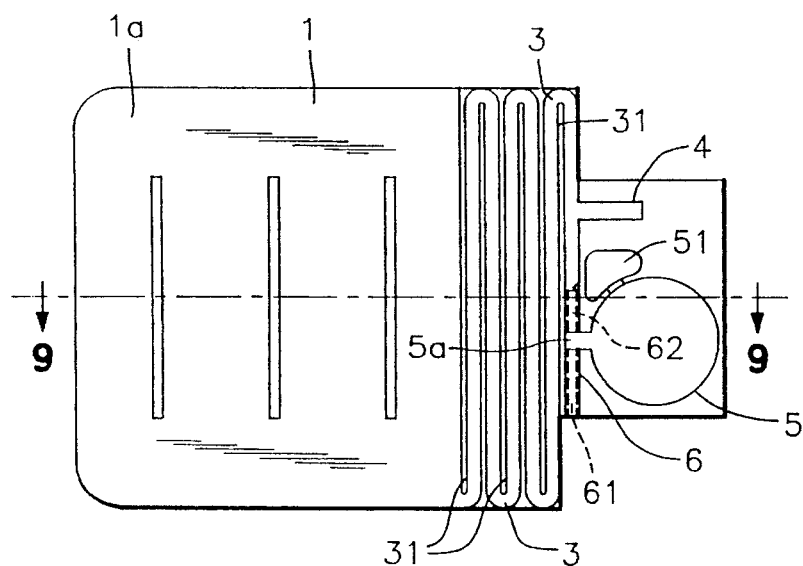
FIG. 8 is a plan view of a third embodiment of the invention showing a tube between a cushion and a pressure pump.
Figure 9:
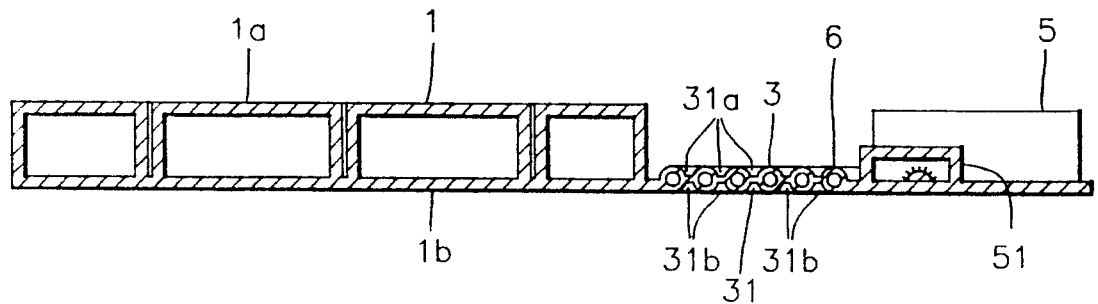
FIG. 9 is a section view on line 9—9 of FIG. 8.

FIGS. 8 and 9 illustrate an integrally formed extension tube 3 between a cushion 1 and a pressure pump 5. The cushion 1, the pressure pump 5 and the extension tube 3 disposed therebetween with a preset length and zig zag shape are integrally formed as a one-piece cushion and pressure pump before cutting of the webs 31 for extending the tube 3. When the pump 5 is required to be pulled out to an extended position for installation, the webs are cut depending on the length of the extension required. The webs 31 are again formed recesses 31a and 31b in the respective cushion sheets 1a, 1b.

An outlet branch 5a of the pump is in communication on one side with a one-way inlet valve 61 in the end portion of tube 3. On its other side, the branch communicates with a one-way outlet valve 62 in tube 3. When the pump is squeezed, it forces air through valve 62 into the cushion and when it is released, it draws air in from the atmosphere through valve 61. A pressure release valve may be provided in branch 4 extending from tube 3 to extract air from the cushion for deflation. Furthermore, a pressure limiting chamber 51 of a preset area and capacity with the design to perform the function of the general pressure release valve is branched out from one side of the pressure pump 5 and integrally formed therewith of the resilient material constituting the pump. The pressure limiting chamber 51 of predetermined volume is connected through to the interior of the pressure pump 5. When the pressure within the cushion 1 has not yet reached the preset pressure value set by the pressure limiting chamber 51 depending on its volume, only the air within the pressure pump 5 is compressed into the pressure limiting chamber as the pressure pump 5 is sucking in the air from outside to the interior of the pressure pump and into the pressure limiting chamber 51 and since the pressure limiting chamber 51 will not be subject to the compression while the pressure pump 5 is. Because the pressure created during the pressurizing process is larger than the inner pressure of the cushion 1, part of the air within the pressure pump 5 is inputted to the cushion through the one-way air outlet valve 62 for pressurizing the cushion, and the pressure valve increases within the cushion 1 with repeated pressurizing and release of the pressure pump 5. When the pressure pump 5 exercises a further pressing down before the air suction making the pressure limiting chamber be fully charged with the pressure reaching the preset pressure value, the pressure pump 5 is subject to the air current flowing back from the pressure limiting chamber 51 and the pressure being larger than that of the ambient pressure outside for the cycle of air suction by inflation from being pressurized to the restoration to its original shape at the pressure pump 5, there is no air supply further at the one-way air inlet valve 61 since the inner pressure is larger than the atmosphere pressure outside, except the air current of the backflow and pressure in the pressure limiting chamber 51, so that there is no air supply further to the cushion 1 even when the pressure pump 5 exercises another pressing down as the air only flows between the pressure pump 5 and the pressure limiting chamber 51. Also, because the inner pressure respectively in the pressure pump 5 and in the pressure limiting chamber 51 are larger than that of the outside ambient pressure as well as that the inner pressure of the cushion 1 is larger than that occurring when both the pressure pump 5 and the pressure limiting chamber 51 are under compression, no air will be sucked into the pressure pump 5 once the inner pressure of cushion 1 is larger than the inner compressing pressure of the pressure pump and the inner pressure is larger than the outside ambient pressure. Therefore, the pressure limiting chamber automatically achieves the safety benefit of stopping the pressurizing of the cushion once the preset pressure value is reached, the setting of the pressure value for said cushion 1 being determined by the area and capacity of the pressure limiting chamber 51. The larger the pressure limiting chamber is, the pressure inflated into the cushion 1 gets higher; and the smaller, the less.

By way of further explanation of the functioning of the pressure limiting chamber, if this chamber was extremely large compared with the size of the pump, it is evident that the pump would have little pressurizing effect on the cushion, because the compression of the pump and its subsequent release would be accommodated in air flow between the pump and the resilient pressure limiting chamber and the latter would expand and contract slightly with the pumping action. Thus, air would not be drawn into the pump through valve 61 except at low pressures and the maximum inflation pressure of the cushion 1 would be low. On the other hand, if the pressure limiting chamber was minute compared with the size of the pump, it would have little influence on the operation of the pump, it would have little influence on the operation of the pump and would not effectively interfere with the pumping action. Thus, the maximum inflation pressure of the cushion would be high. In practice, the size of the pressure limiting chamber is between these two extremes.

Also, by having a plurality of pressure limiting chamber of different size, selectively connectable to the pump, the maximum inflation pressure of the cushion can be adjusted. An embodiment of the invention provided with such an arrangement is shown in FIGS. 10 and 11.

Figure 10:
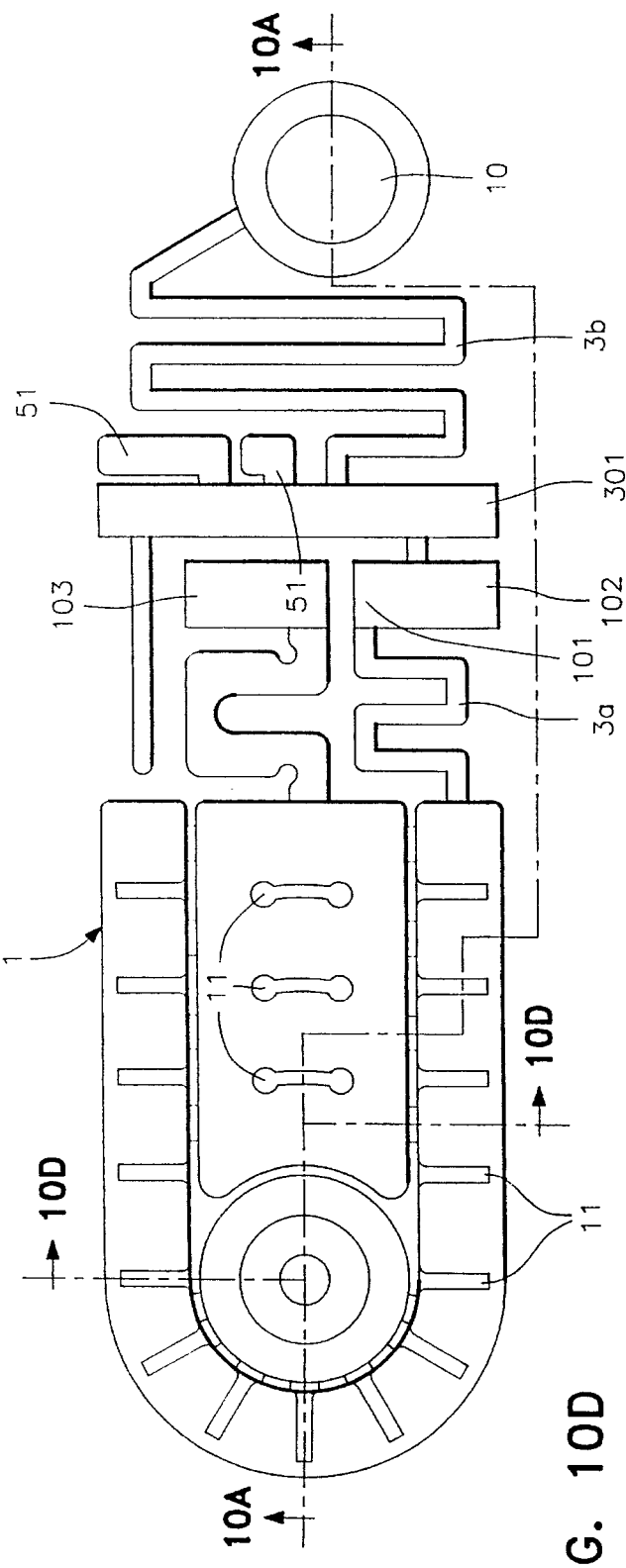
FIG. 10 is a plan view of a fourth embodiment cushion according to this invention.
Figure 10D:
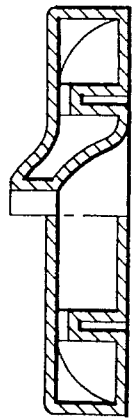
FIG. 10D is a view on line 10D—10D of FIG. 10.
Figure 10A:
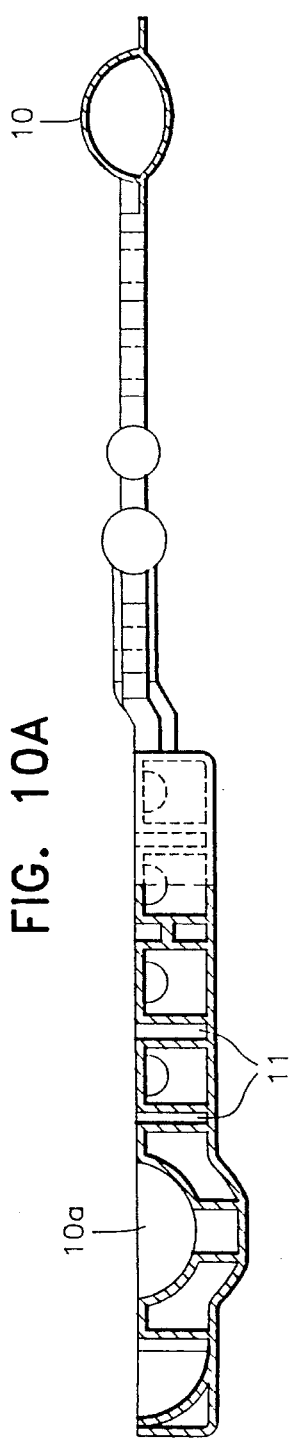
FIG. 10A is a sectional view on line 10A—10A of FIG. 10.
Figure 11:
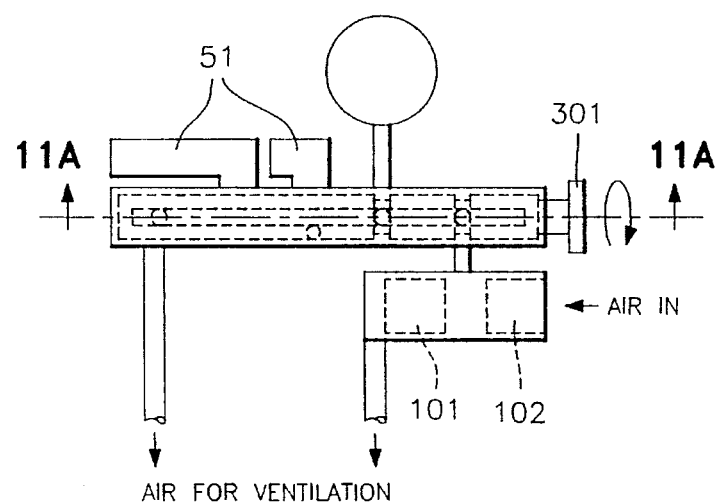
FIG. 11 is a diagrammatic view of an adjustable volume inflation pressure controlling chamber system for cushion structures according to the invention.
Figure 11A:
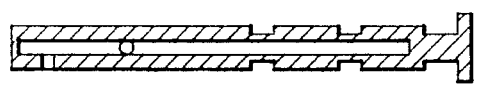
FIG. 11A is a diagrammatic view of a piston used in the system shown in FIG. 11.

Referring to FIGS. 10–10D a cushion structure suitable, for example, as a shoe insert has an inflatable cushion of similar form to those previously described and formed from sealed plastic sheeting or the like with another set of recesses 11 dividing the cushion interior into intercommunicating compartments. Integrated with the cushion and extending from one end thereof is a pumping system including serpentine inflation conduits 3a, 3b terminating in a compressible pump 10 and connections between the conduit sections as will be described. Said connections include a first-connection containing air inlet and outlet valves 102, 101 conforming to the valves 62, 61 of the previous embodiment with branches forming two different size pressure limiting chambers which can be selectively connected to the pump 10 by means of a spool valve or piston 301 (see FIGS. 11 and 11A) received in the second connection. The spool valve has suitable passages therein whereby rotation of the valve can connect either one of the chambers 51 with the pump so as to select the required maximum inflation pressure of the cushion while maintaining the flow connection between the pump and cushion through conduits 3a, 3b. Reference 103 denotes a pressure release valve for the cushion.

Figure 10B:
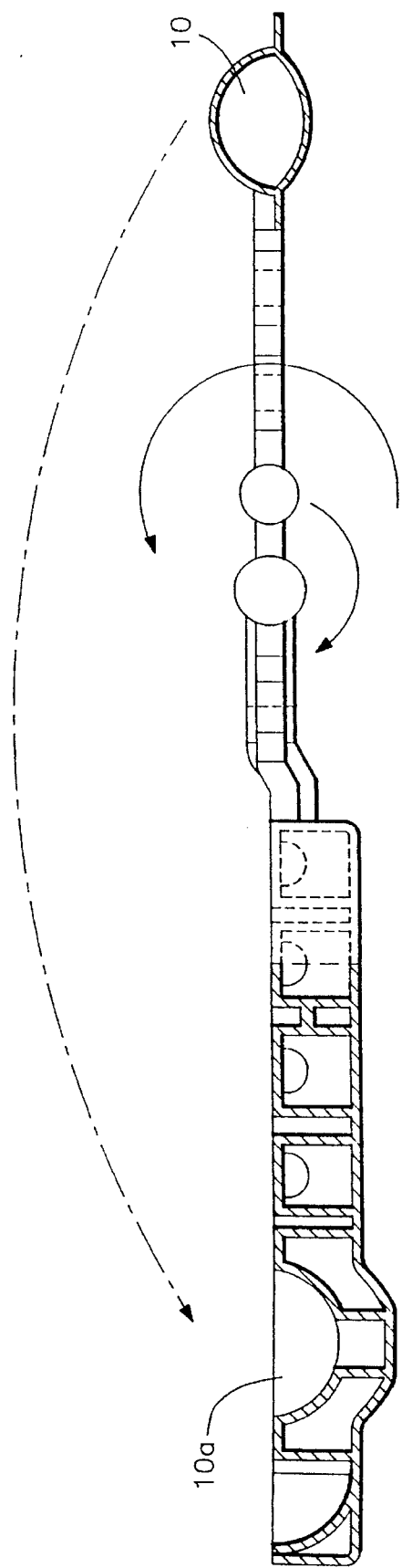
Figure 10C:
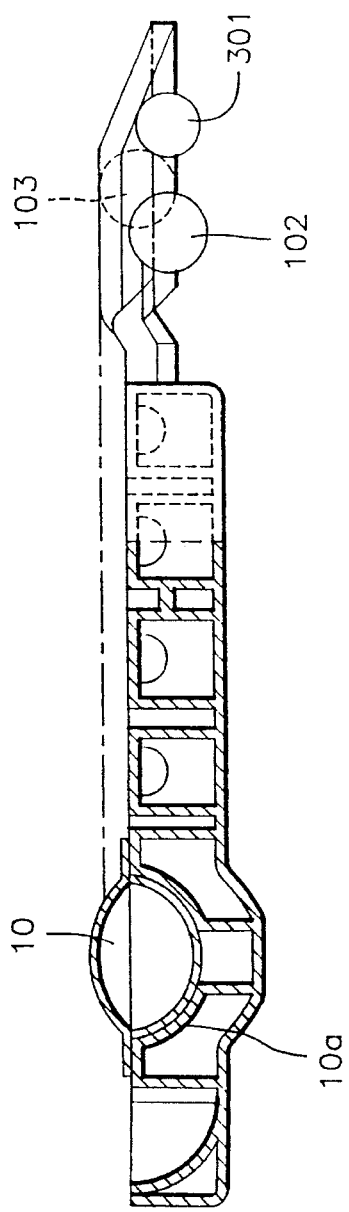
FIG. 10C is a view similar to FIG. 10B showing the cushion folded.

As shown in FIGS. 10B and 10C the pumping system can be folded so that pump 10 is received in a complimentary recess in the cushion denoted as 10a.

Figure 12:
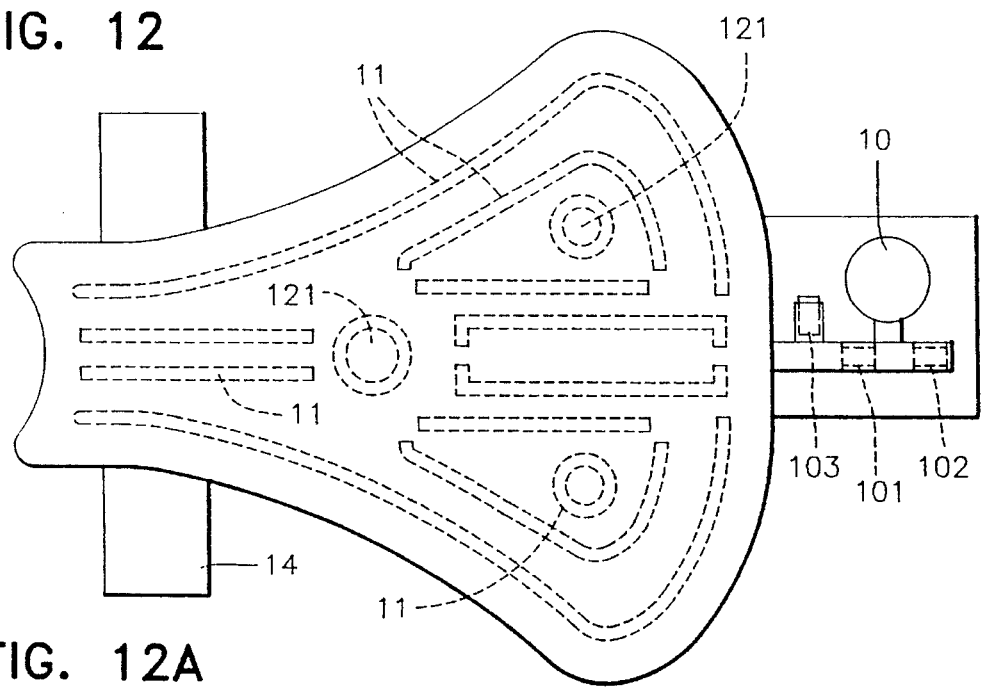
FIG. 12 is a plan view of an air cushion structure according to the invention for use in a bicycle saddle.
Figure 13:
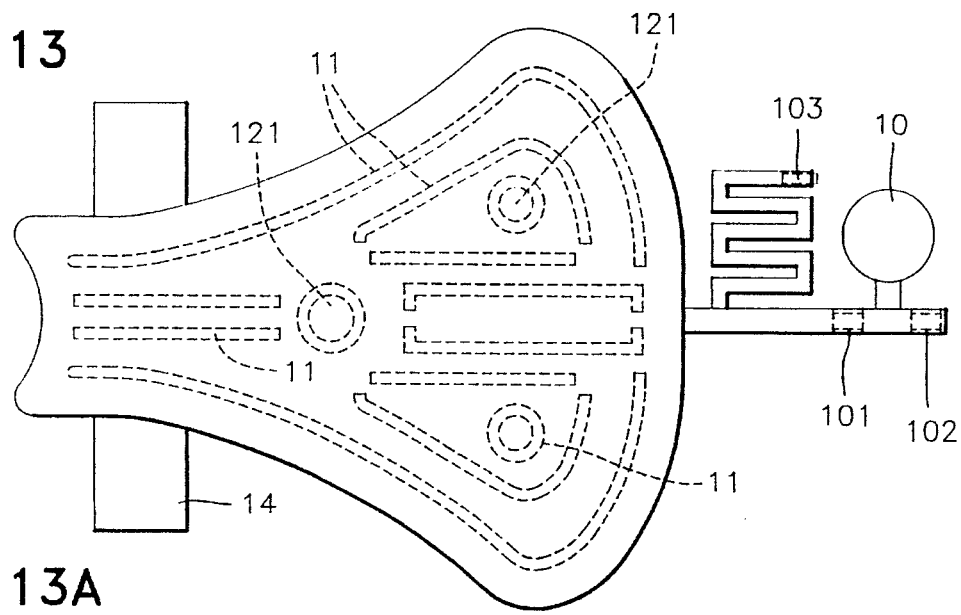
FIG. 13 is a plan view of another air cushion structure according to the invention for use in a bicycle saddle.
Figure 13A:
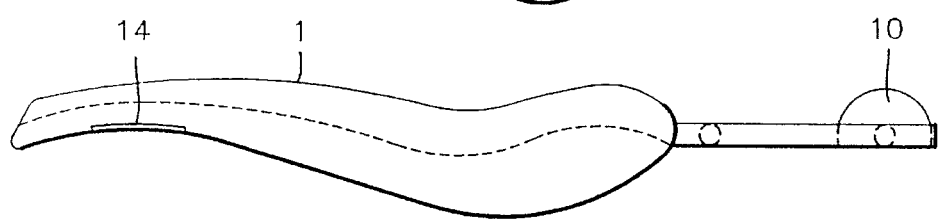
FIG. 13A is an elevational view of the cushion shown in FIG. 13.
Figure 14:
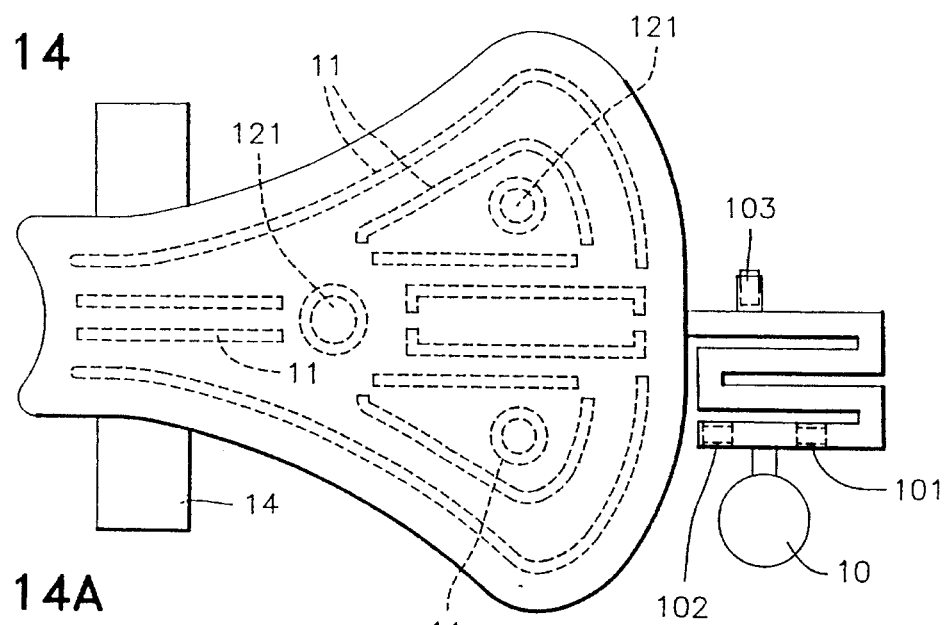
FIG. 14 is a plan view of still another cushion structure according to the invention for use in a bicycle saddle.
Figure 14A:
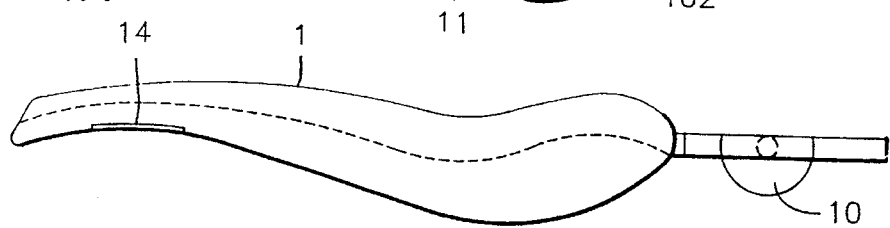
FIG. 14A is an elevational view of the cushion shown in FIG. 14.

FIGS. 12–14 show embodiments of the invention wherein the respective inflatable cushions are shaped to fit in a bicycle saddle for adjusting the hardness of the saddle by inflating or deflating the cushion, the structures otherwise being similar to those previously described and like references being used to denote like parts.

Figure 12A:
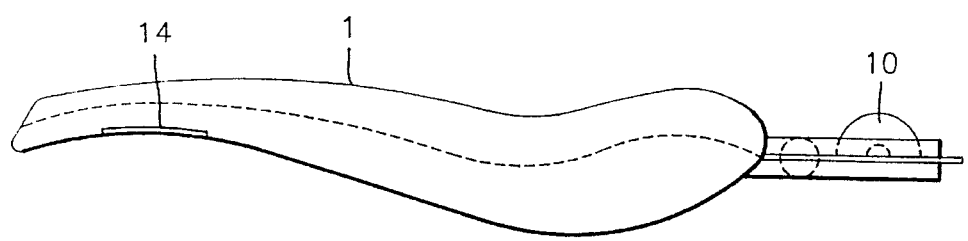
FIG. 12A is a elevational view of the cushion shown in FIG. 12.

In the FIG. 12 embodiment, the cushion has an integral tab at the back formed integrally with the compressible pump 10, and conduit for receiving the inlet and outlet valves 102, 101 and the pressure release valve 103. The tab can be folded under the cushion as shown in FIG. 12A when the cushion is incorporated in a bicycle saddle. The cushion also has recesses 11 as in the previous embodiments subdividing the interior of the cushion into separate compartments. The embodiment shown in FIG. 13 is similar except that the release valve 103 is received in an integral serpentine or zig-zag conduit, so that the release valve can be located at an adjustable distance from the cushion, for example, at the side of the saddle. Likewise in FIG. 14, the pump along with the inlet and outlet valves are on an integral serpentine or zigzag conduit, sot hat these components can be located at adjustable distances from the cushion. It is to be understood that any of the cushion embodiments shown in FIGS. 12–14 could also be provided with a fixed volume pressure limiting chamber of the kind shown in FIGS. 8 and 9, or with selectively usable pressure limiting chamber of the kind shown in FIGS. 10 and 11.

To sum up, in practical applications, the present invention gives the following benefits: 1) by utilizing a zig zag or serpentine extension tube made of sheet materials cut according to the actual application needs the cushions connected to both ends of said extension tube or other components have a stretch capacity of a required range while maintaining one-piece integrity without any extension connections; 2) in addition to the leakage free aspect due to the cushions, extension tube, the hollow round tube providing for the displacement of the other components and the pressure pump being integrally formed, the present invention provides a design meeting the expedient and practical needs of a cushioning device suitable for various dimensions; 3) all components outside the cushion can be pulled by means of the extension tube to other places; 4) giving the automated presssure pump and integrally formed pressure limiting chamber to replace the pressure relief valve so that the pressure value inside the cushion can maintain a constant pressure present by the pressure limiting chamber, preventing the cycle of pressing and releasing motion of the pressure pump fail from sucking in the air for delivering into the cushion once the pressure inside the cushion reaches the preset value, while the same cycle of motion will suck in the air and deliver same into teh cushion to supplement and pressure therein for reaching the preset value in the event that the pressure in,the cushion is below the preset value; 5) eliminating an additional tube to connect and to pull between cushions or between a cushion and other component, and thereby preventing air leakage; and 6) one-piece integrated manufacturing to provide a leakage free, fast and simple process, low production cost, excellent practical effectiveness, and comprehensive application.

While only preferred embodiments of the invention have been described herein in detail, the invention is not limited thereby and modifications can be made within the scope of the attached claims.

I claim:

1. An air cushion having at least one extension tube with one end communicating with the interior of the cushion, said tube being integrally formed with said cushion and having a zig-zag form with adjacent limbs which can be moved apart and together so as to adjust the spacing between the cushion and a second end of the tube wherein the cushion is shaped to fit a bicycle saddle.

2. An air cushion according to claim 1, wherein the second end of the tube is connected to a component of a pumping means for inflating the cushion.

3. An inflatable air cushion shaped to fit a bicycle saddle, a compressible pump for inflating the cushion and a release device for selectively discharging air from the cushion wherein at least one of the pump and the release device is carried on tube means connected with the cushion, said tube means having a zig-zag portion with adjacent limbs which can be moved apart and together to vary the positioning of said at least one of the pump and the release device relative to the cushion.

4. An air cushion as claimed in claim 3 wherein the zig-zag tube is connected with the release device and branches off another portion of the tube means connected with the pump.

5. An air cushion as claimed in claim 3 wherein the release device is connected to one end of the zig-zag tube and the pump is connected to an opposite end of the zig-zag tube.

6. An inflatable air cushion shaped to fit a bicycle saddle and a compressible pump for inflating the cushion wherein the pump is carried on tube means connected with the cushion, said tube means having a zig-zag portion with adjacent limbs which can be moved apart and together to vary the positioning of the pump relative to the cushion.

7. A molded air cushion structure comprising two superimposed synthetic plastic sheets peripherally sealed together and bounding an interior space with an air inlet, a first group of recesses formed in one of said sheets and being sealed together with the other of said sheets, said recesses defining an air flow conduit means between a first cushion portion of the structure and a second cushion portion of the structure, said second cushion portion of the structure including said air inlet and being molded to provide an inflation means for the first cushion portion.

8. A molded air cushion structure as claimed in claim 7 which includes a second group of recesses formed in the other of said sheets conforming to and sealed together with the first group of recesses.

9. A molded air cushion as claimed in claim 7 wherein the first group of recesses define cutable webs formed between adjacent limbs of a zig-zag conduit forming said conduit means whereby selective cutting of said webs provides adjustment in spacing between the first and second cushion portions.

10. A molded air cushion structure as claimed in claim 7 wherein the second cushion portion is molded to include a compressible pump for inflating the first cushion portion and wherein the air inlet comprises an inlet to said pump.

* * * * *